(12) United States Patent
Hiraga et al.

(10) Patent No.: US 7,127,462 B2
(45) Date of Patent: Oct. 24, 2006

(54) METHOD AND APPARATUS FOR MANAGING A DATABASE AND PROCESSING PROGRAM THEREFOR

(75) Inventors: Shigeto Hiraga, Yokohama (JP); Takashi Itaya, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 394 days.

(21) Appl. No.: 10/602,621

(22) Filed: Jun. 25, 2003

(65) Prior Publication Data

US 2004/0054922 A1 Mar. 18, 2004

(30) Foreign Application Priority Data

Jun. 28, 2002 (JP) ............................ 2002-188931
Jun. 23, 2003 (JP) ............................ 2003-177458

(51) Int. Cl.
*G06F 7/00* (2006.01)
*G06F 17/30* (2006.01)

(52) U.S. Cl. ............................................ 707/9; 707/8
(58) Field of Classification Search .................... 707/1, 707/204, 100, 9, 104.1, 8, 202; 711/162; 713/201
See application file for complete search history.

(56) References Cited

U.S. PATENT DOCUMENTS

| 5,924,094 | A | 7/1999 | Sutter |
| 6,397,228 | B1 | 5/2002 | Lamburt et al. |
| 6,487,552 | B1 * | 11/2002 | Lei et al. ........................ 707/4 |
| 2004/0059734 | A1 | 3/2004 | Smith et al. |
| 2004/0139116 | A1 | 7/2004 | Porter |
| 2004/0250098 | A1 | 12/2004 | Licis |
| 2005/0086258 | A1 * | 4/2005 | Murahashi et al. ......... 707/104.1 |
| 2005/0165868 | A1 * | 7/2005 | Prakash ....................... 707/204 |

OTHER PUBLICATIONS

Glover et al., "Multilevel Secure Databases: A New Approach", IEEE Proceedings of Southeastcon '91, Apr. 1991; vol. 2, pp. 690-694.*
Gladney, "Access Control for Large Collections", ACM Transactions on Information Systems, vol. 15, No. 2, pp. 154-194. Apr. 1997.*
Moran et al., "Oracle8 Server Concepts", Section 4: The Data Dictionary; Release 8.0, 1997.*
Hilchenbach, "Observations on the Real-World Implementation of Role-Based Access Control". In 20th National Information Systems Security Conference, Oct. 1997.*
Jensen et al., "Transaction Timestamping in (Temporal) Databases", Proceedings of the 27th VLDB Conference, Rome, Italy, pp. 441-450, Sep. 11-14, 2001.*

* cited by examiner

*Primary Examiner*—Jeffrey Gaffin
*Assistant Examiner*—Michael J. Hicks
(74) *Attorney, Agent, or Firm*—Mattingly, Stanger, Malur & Brundidge, P.C.

(57) ABSTRACT

A database management system is provided for protecting data from being malicious update or deleted. The system is arranged to hold as a table attribute an insert-only attribute and a row deletion prohibition period, and as an access right attribute a row insertion date and time holding column name and to specify a row insertion date and time when a row was inserted, for disabling said date and time data. When requesting a table data update or a row deletion, the table attribute and the row insertion date and time are checked for preventing the malicious update and deletion.

7 Claims, 14 Drawing Sheets

METHOD AND APPARATUS FOR MANAGING A DATABASE AND PROCESSING PROGRAM THEREFOR

BACKGROUND OF THE INVENTION

1. Field of the Invention

The present invention relates to a system concerning a database management technology of managing a right of access to a database.

2. Description of the Related Art

The database management system of managing a right of access to a database is arranged to give the right of access to a database only to a database owner and persons to whom the access is authorized by the database owner. The system thus is quite useful of specifying and managing the access right to the database of each table or each user.

In the system, however, though a database is not to be updated, the owner, the person to whom an update right is transferred, or the person who passes himself or herself off as the owner or the authorized person may erroneously or falsely update the database.

As a problem the conventional database management system involves, the system may not protect the data that is not to be updated from the erroneous or false update executed by a table owner, a person to whom the update right is transferred, or a person who passes himself or herself off as those persons.

It is an object of the present invention to provide a method and an apparatus for managing a database which are arranged to protect the database from being falsely or erroneously updated by authorizing insertion of or reference to data, disabling change of the data, and inhibiting change of the access control attributes in a case that an attribute of preventing interpolation is specified to the data.

SUMMARY OF THE INVENTION

According to an aspect of the invention, the database management method includes the steps of, if an attribute of preventing interpolation is specified in defining a database, registering it as the database attribute of a data dictionary, checking for the database attributes when the data update is requested, if the database includes the attribute of preventing interpolation, and making change of a table disabled even for an owner of the database. This method makes it possible to prevent the table data from being falsely or erroneously updated.

Further, if a period when a row deletion is prohibited and a name of a column where a row insertion date and time is to be held are specified in addition to the specification of the insert-only attribute when defining the database, the database management method includes the steps of registering these pieces of data as the database attributes of a dictionary, specifying a row insertion date and time to the column where a row insertion data and time is to be held when inserting a row, and thereby disallowing the data in the concerned column to be updated even by a database owner or a person to whom a table update right is transferred by the database owner. Then, the method further includes the step of checking the table attribute and the row insertion date and time when a row deletion is requested, if the database includes the insert-only attribute and the row deletion prohibition period specified thereto, so that the row deletion is disallowed even by the database owner until the row deletion prohibition period expires after the row insertion. The method thus allows the deletion of the concerned data to be prohibited during a certain period since the data insertion date, that is, during the period specified as the row deletion prohibition period.

Moreover, by referring to the insert-only attribute registered in the dictionary where the access control data of the database is stored, the method enables to prevent the false deletion and update of the data by the database definition deletion or change.

Further, by recording the unload date and time in the status file and the external recording medium and referring to the insert-only attribute information registered in the dictionary, the method enables to protect the data with the insert-only attribute from being falsely deleted or updated when reloading the data.

Other objects, features and advantages of the invention will become apparent from the following description of the embodiments of the invention taken in conjunction with the accompanying drawings.

DESCRIPTION OF EMBODIMENTS

Hereafter, one embodiment of the present invention will be described with reference to FIGS. 1 to 10.

Figure 1:
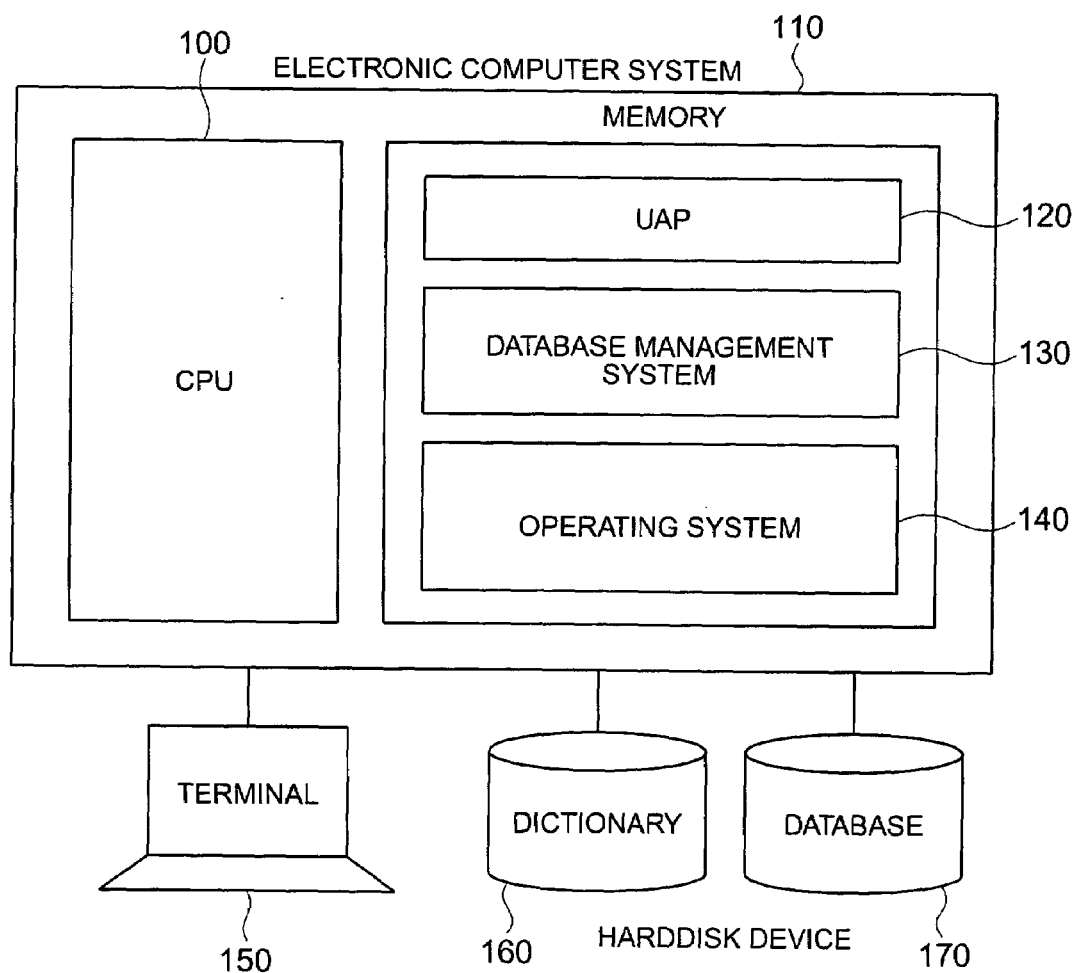
FIG. 1 is a diagram showing a database management apparatus according to an embodiment of the present invention.

The database management method and apparatus according to the present invention are illustrated in FIG. 1. The database management system 130 is composed of a computer system 110, which includes a CPU 100, a memory including UAP 120, a terminal device 150, and a harddisk device. A dictionary 160 is allocated on the harddisk device and is operated on an operating system 140. The dictionary 160 stores a logical database saving area and definition information of a table and the saving area.

The dictionary 160 stores a database 170 design specification including a table structure, a column definition, an index definition, and so forth of the database. The information stored in the dictionary is required in referring to or updating the database. The dictionary table for managing the tamperproof information, which is the feature of the present invention, is made up of a table name column, an insert-only attribute column, a row deletion prohibiting period column, and a column of row insertion date and time holding column names, which are stored in the dictionary. The dictionary table corresponds to the table 202 in FIG. 2. The present invention is now being described with an example of a relational database. In action, however, the present invention may be applied not only to the relational database but also any other kind of database. Herein, the term "interpolation prevention" means an access right that is functioned to disallow change of the data registered in the database even by a database owner and a person to which an access right is authorized cannot be changed by the database owner and the person to whom the access right is authorized by the database owner. This insert-only attribute cannot be changed by the database owner and the person to whom the access right is authorized by the database owner. Only the manager on the upper database level can change the attribute.

Figure 2:
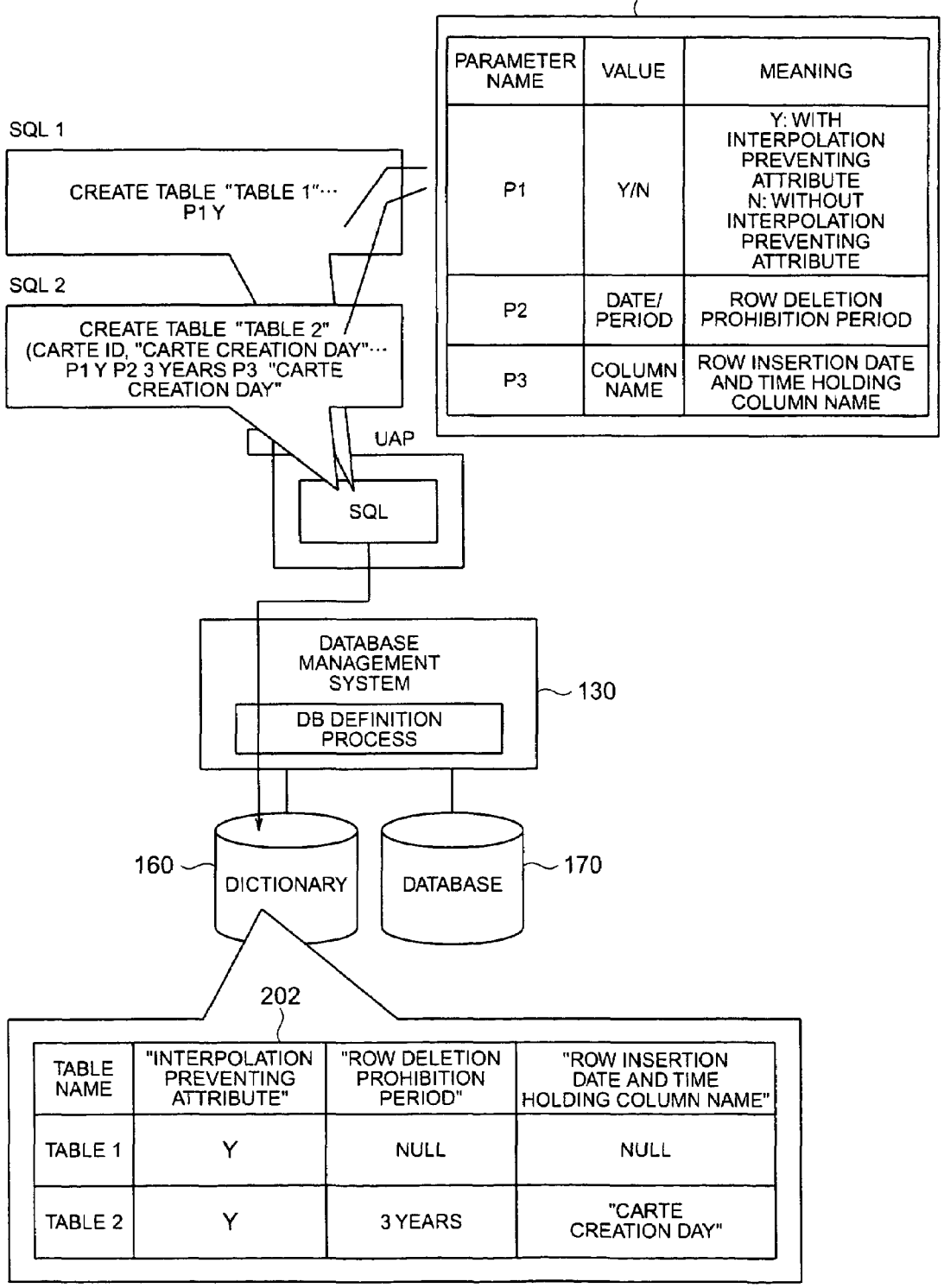
FIG. 2 is a diagram showing an exemplary content of a dictionary table in which a define statement for defining interpolation prevention and tamperproof information are stored.

FIG. 2 shows an example of a table define statement that represents the feature of the present invention and the saving state of the interpolation prevention define information in the dictionary. The table 1 shown in SQL1 and the table 2 shown in SQL2 may be changed to the tables with the insert-only attribute by specifying "Y" to a parameter name P1 shown in a block 201. The character "Y" that indicates the change is saved in the insert-only attribute column of the dictionary 202. Further, the table 2 may be changed into the table in which the row may be deleted only since the deletion prohibit period is passed after the row is inserted by specifying the row deletion prohibition period in the parameter name P2 shown in 201 and the row insertion date and time holding column in the parameter name P3 shown in 201 in addition to specifying the insert-only attribute. The corresponding values with the row deletion prohibition period column and the column of the row insertion date and time holding column names of the dictionary are saved in the table 201. In this embodiment, the description has been described with an example of the relational database. Hence, the row insertion and the row deletion have been described. For any kind of database, likewise, the insertion of the data is permitted but the deletion of the data is prohibited. In addition, in FIG. 2, the parameter P3 is specified by a user. In place of the user specification, it may be automatically, that is, implicitly specified by the system.

An example of the SQL in the case of defining the table of the table data update disable and row deletion disable corresponds to the SQL1. The table 1 defined in the SQL1 allows the row to be inserted and retrieved (or referenced) but disallows the table data update and row deletion. Turning to an SQL2, the SQL2 is an example of the SQL that is the same as the SQL1 in the respect that the table data update is disabled but optionally allows the row to be deleted only if a certain period is passed after the row insertion. In this SQL example, the row is allowed to be deleted only if three years have passed after the row is inserted. The table 2 defined in the SQL2 is the same as the table 1 in the respect that the row insertion and retrieval is enabled but the table data update is disabled. However, it is different from the table 1 in the respect that the row may be deleted only if a certain period has passed after the row insertion. In the example of the SQL2, the "Three years" is specified to the row deletion prohibition period and the "carte creation date" is specified as the row insertion history holding column name. By this specification, when the row is inserted in the table 2, the row insertion date and time is automatically saved in the "carte creation date" by the system. In requesting to delete the row in the table 2, the added result of the "three years" to the row insertion date and time saved in the "carte creation date" is compared with the row deletion request date and time. The target row may be deleted if three years have passed since the row is inserted. These attributes specified in the database cannot be changed by the database owner or the person to whom the access is authorized. That is, once specified, they cannot be changed by the database owner or the person to whom the access is authorized. This makes it possible to protect the database from being falsely or erroneously changed.

Figure 3:
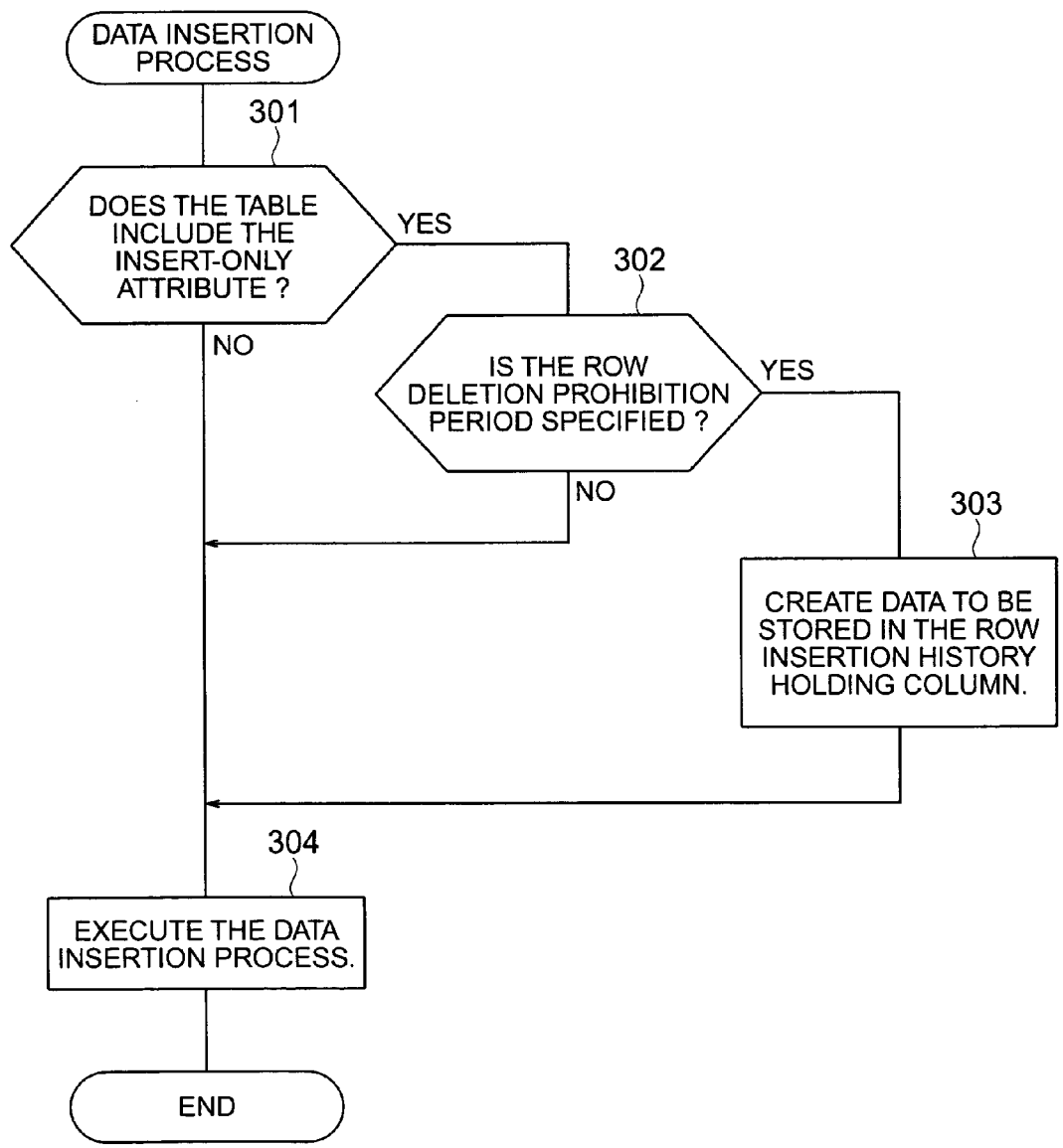
FIG. 3 is a flowchart illustrating a flow of data insertion.

FIG. 3 shows the flow of a process of inserting data into the table. In the case of inserting the data into the table, at first, it is checked if the table includes the insert-only attribute (301). If the table includes no insert-only attribute, the process of inserting the data is executed as it is (304). If the table includes the insert-only attribute, it is checked if the row deletion prohibition period is specified (302). If in the step 302 the table includes the row deletion prohibition period specified thereto, the data inserting process is executed. If the table includes the specification of the row deletion prohibition period in the step 302, the data (time stamp) to be saved in the row insertion history holding column is created (303), and then the data inserting process is executed. Herein, the user disables to specify the data to be saved in the row insertion history holding column. If the user specifies the data, the specified value is ignored and the data created by the system is saved. As the concrete data, in the table 2 shown in FIG. 4, the "001" row of the "carte ID" column is inserted on Jun. 1, 2002. Likewise, the "002" row of the "carte ID" column is inserted on Jun. 10, 2002, and the "003" row of the "carte ID" column is inserted on Jun. 18, 2002.

Figure 4:
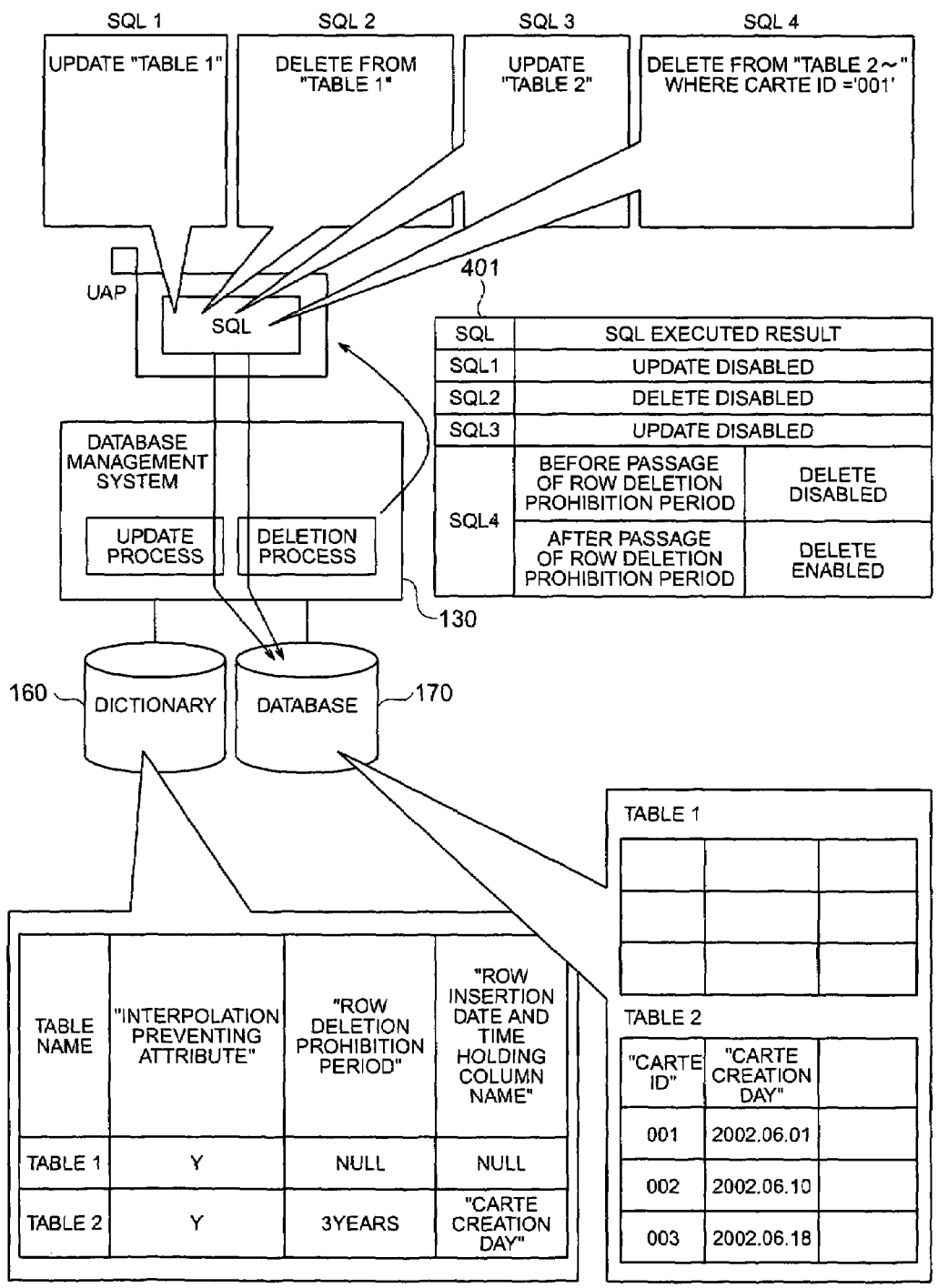
FIG. 4 is a diagram showing the executions of table data deletion SQL and row deletion SQL in the system.

FIG. 4 shows the process of executing the update SQL and the row deletion SQL of the table data after inserting the data into the tables 1 and 2 defined in FIG. 2. In FIG. 4, SQL1 means the SQL that indicates an update to a certain row on the table 1, SQL2 means the SQL that indicates deletion of a certain row on the table 1. SQL3 means the SQL that indicates an update to a certain row on the table 2. SQL4 means the SQL that indicates deletion of a row with "001" specified as the value of the "carte ID" column on the table 2. In a case that the SQL (SQL1 or SQL3) that indicates an update of the table data is executed with respect to the table 1 or the table 2 with the insert-only attribute, the database management system gives back the information that indicates the UPDATE enabled to UAP (401). In a case that the SQL (SQL2) that indicates the row deletion is executed with respect to the table 1 with no specification of the row deletion prohibition period, the database management system gives back the information indicating DELETE disabled to the UAP. In a case that the SQL (SQL4) that indicates the row deletion is executed with respect to the table 2 with the deletion prohibition period, if the row deletion prohibition period does not expire as to the target row to be deleted, the database management system gives back the message of DELETE disabled to the UAP, and if the period expires as to the target row, the database management system executes the DELETE process.

Figure 5:
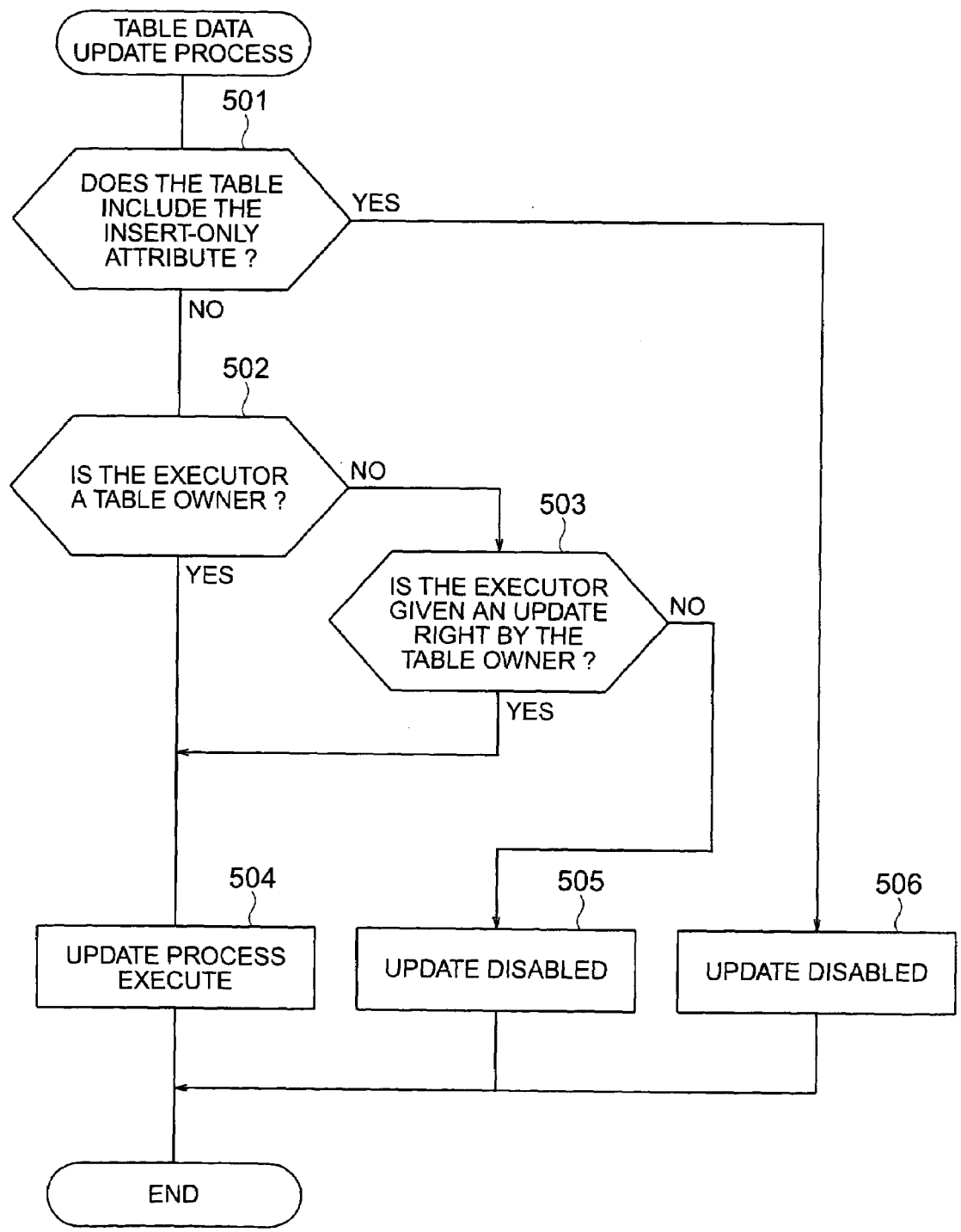
FIG. 5 is a flowchart showing a flow of data update.

FIG. 5 shows the flow of a process of updating table data. In response to a request for updating the table data, at first, it is checked if the table includes the insert-only attribute (501). If the table includes no insert-only attribute, it is checked if the table update executor is a table owner (502). If the executor is the owner, the update process is executed (504). If the executor is not the owner, it is checked if the update executor is given an update right to the concerned table by the table owner (503). If given, the update process is executed (504). If not given, the update is disabled (505). On the other hand, if the table includes the insert-only attribute in the step 501, even if the update executor is the table owner, the update is disabled (506). As a concrete example, in the SQL1 and the SQL3 in FIG. 4, "Yes" is given in the check of the step 501, and thus the update is disabled.

Figure 6:
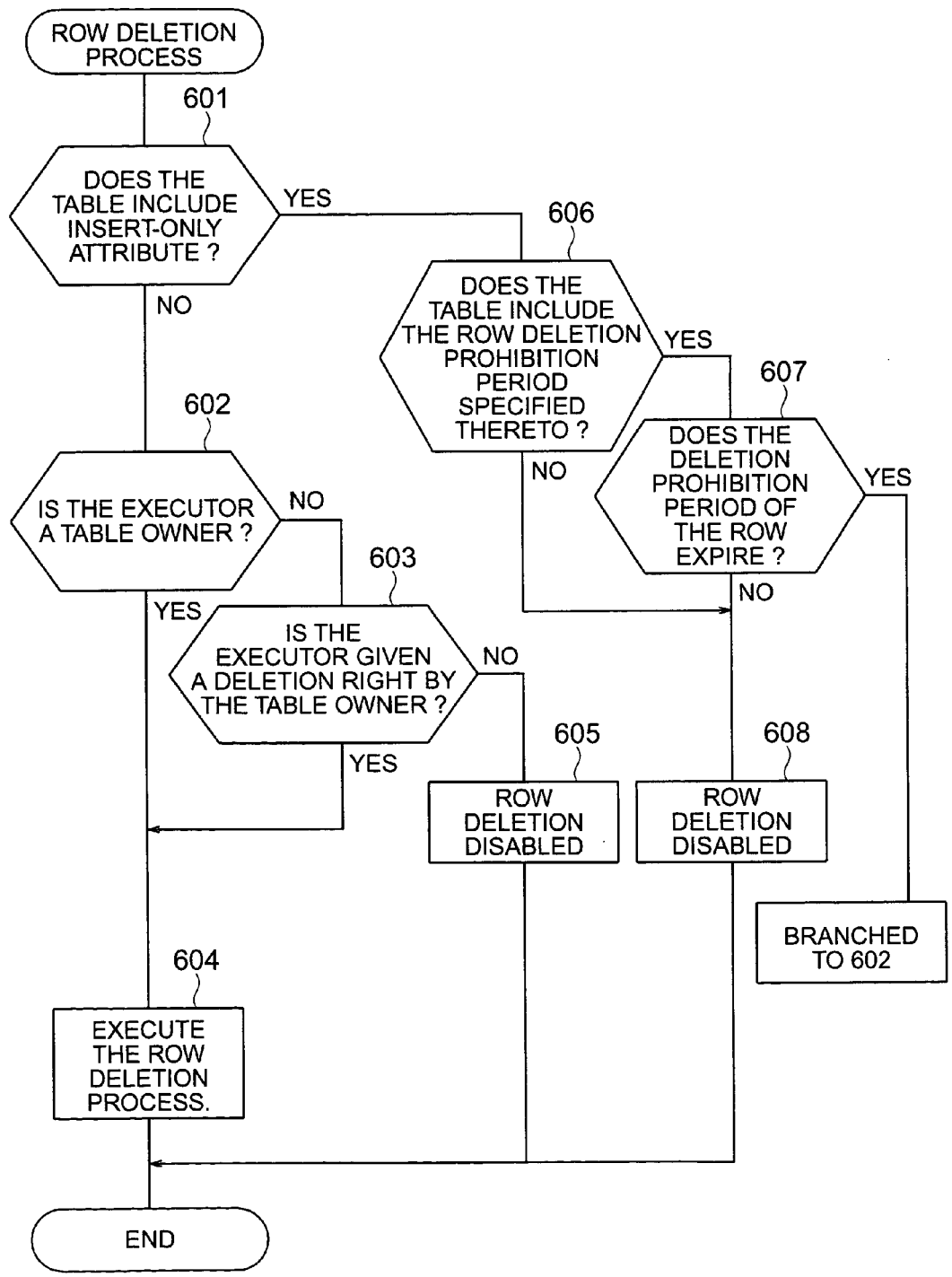
FIG. 6 is a flowchart showing a flow of row deletion.

FIG. 6 shows a flow of a process of deleting a row. In the case of requesting the row deletion, it is checked if the table includes the insert-only attribute (601). If the table includes no insert-only attribute, it is checked if the executor of the row deletion is a table owner (602). If yes, the row deletion process is executed (604). If no, it is checked if the row deletion executor is given a row deletion right to the concerned table by the table owner (603). If yes, deletion processing is executed (604), and if no, then the deletion processing is prohibited (605). On the other hand, if the table includes the insert-only attribute in the step 601, it is checked if the table includes the specification of the row deletion prohibition period (606). If the table does not include the row deletion prohibition period specified thereto, the deletion is disabled even for the table owner (608). If in the step 606 the table includes the row deletion prohibition period specified thereto, the value of the row deletion prohibition period column is added to the value of the row insertion date and time holding column included in the row to be deleted. Then, the added value is compared with the row deletion execution date for the purpose of checking if the deletion prohibition period expires (607). If the period expires as to the row, the process is branched into the process 602, while if the period does not expire as to the row, the row deletion is disabled (608). As a concrete example, in the SQL2 shown in FIG. 4, in the step 601, "Yes" is given, while in the step 606, "No" is given, and the row deletion is disabled. In the SQL3, in the step 601, "Yes" is given and in the step 606, "Yes" is also given. In the determination in the step 607, if as to a row the deletion prohibition period expires, "Yes" is given, and the table owner or the person to whom the deletion right is transferred by the table owner enables to delete the row, while if as to another row the prohibition period does not expire, "No" is given, and the row deletion is disabled.

Figure 7:
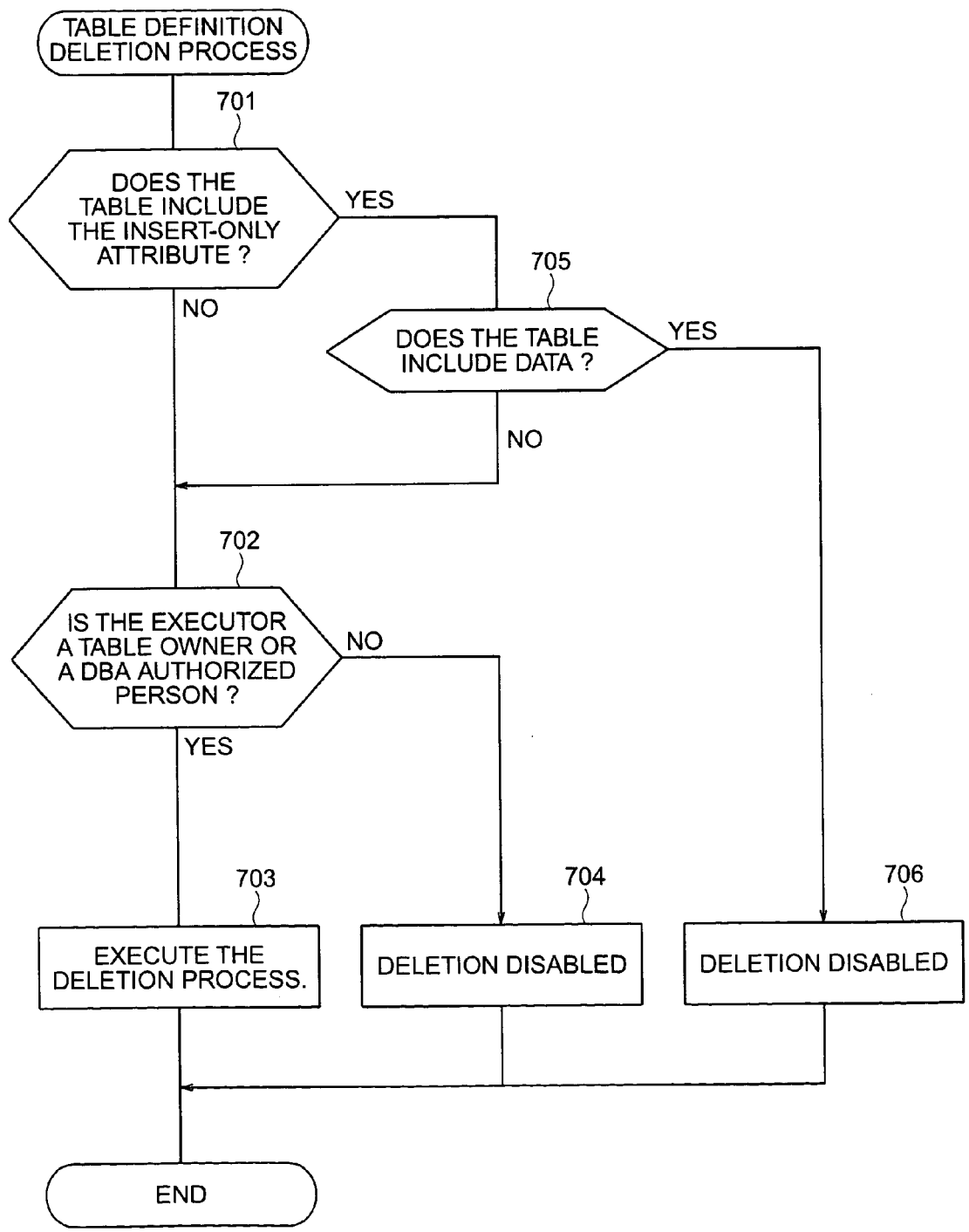
FIG. 7 is a flowchart showing a flow of table definition deletion.

FIG. 7 shows a flow of a process of deleting a table definition. In the case of issuing a request for deleting a table definition, at first, it is checked if the target table includes the insert-only attribute (701). If no, it is also checked if the deletion executor is a table owner or a person to whom a DBA (Database Administrator) right is authorized (702). If yes, the process of deleting the table definition is executed (703). If no in the step 702, the table definition deletion is disabled (704). On the other hand, if the table is checked to have the insert-only attribute in the step 701, it is checked if the table contains the data (705). If yes, the table definition deletion is disabled even for the table owner or the DBA authorized person (706). If no data is contained in the table in the step 705, the process is branched into the step 702. Concretely, consider the case that the request for deleting the table definition is issued to the tables 1 and 2 shown in FIG. 4. In this case, "Yes" is given in the step 701, and "Yes" is also given in the step 705, so that the table definition deletion is disabled.

Figure 8:
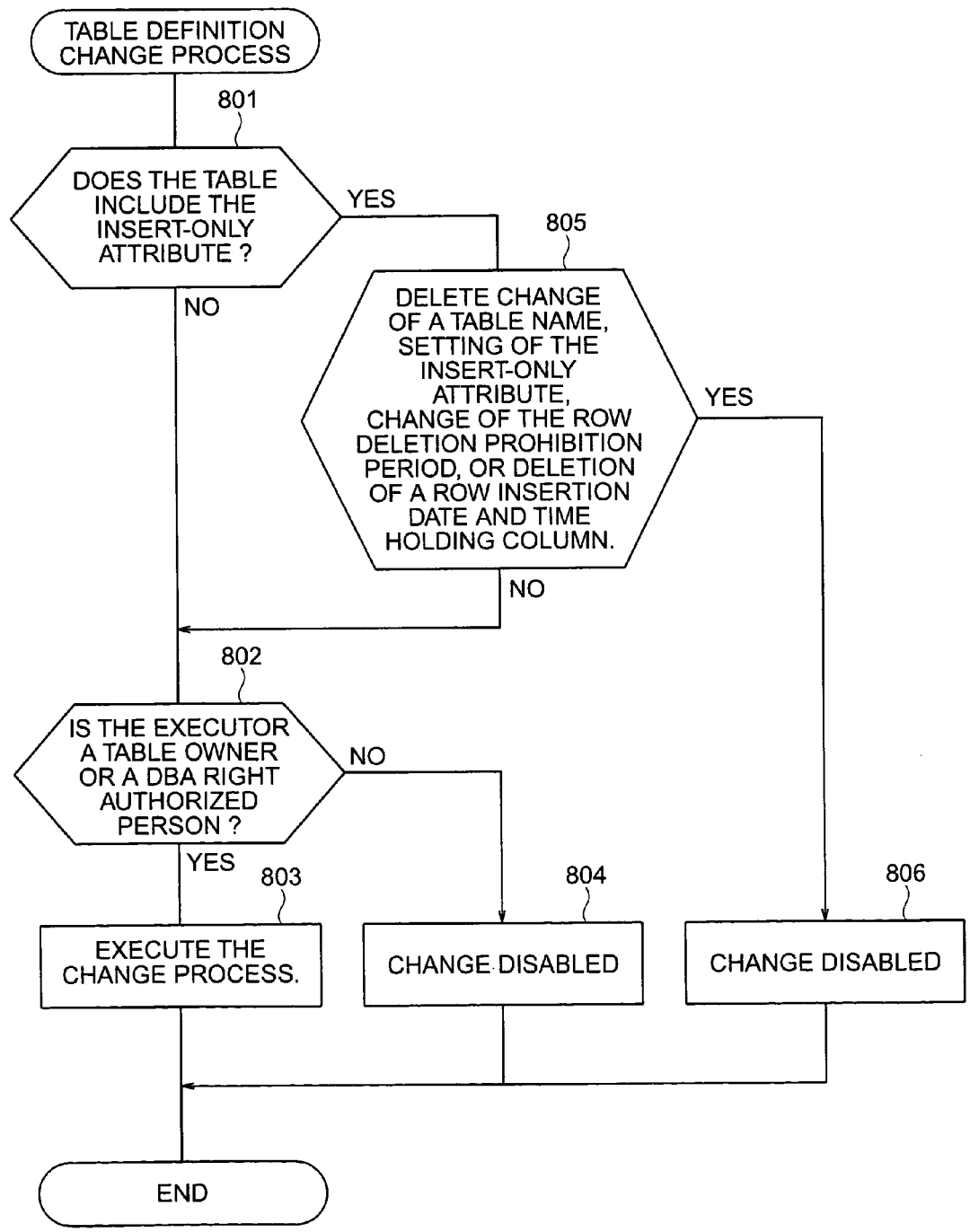
FIG. 8 is a flowchart showing a flow of table definition change.

FIG. 8 shows a flow of a process of changing a table definition. In the case of issuing a request for changing a table definition, at first, it is checked if the table includes the insert-only attribute (801). If no, it is checked if the executor of the table definition change is a table owner or a DBA authorized person (802). If yes, the process of changing the table definition is executed (803). If no, the table definition change is disabled (804). On the other hand, if the table includes the insert-only attribute in the step 801, it is checked if the type of the change is change of a table name, release of the insert-only attribute, change of the row deletion prohibition period, or deletion of the row insertion date and time holding column (805). If the change type matches to any of them, the table definition change is disabled even for the table owner or the DBA authorized person (806). If the change type does not match to any of them in the step 805, the process is branched into the step 802. Concretely, consider the case that the request for changing the table definition (the change of a table name, the release of the insert-only attribute, the change of the row deletion prohibition period, or the deletion of the row insertion date and time holding column). In this case, "Yes" is given in the step 801, and "Yes" is also given in the step 805, so that the table definition change is disabled.

Figure 9:
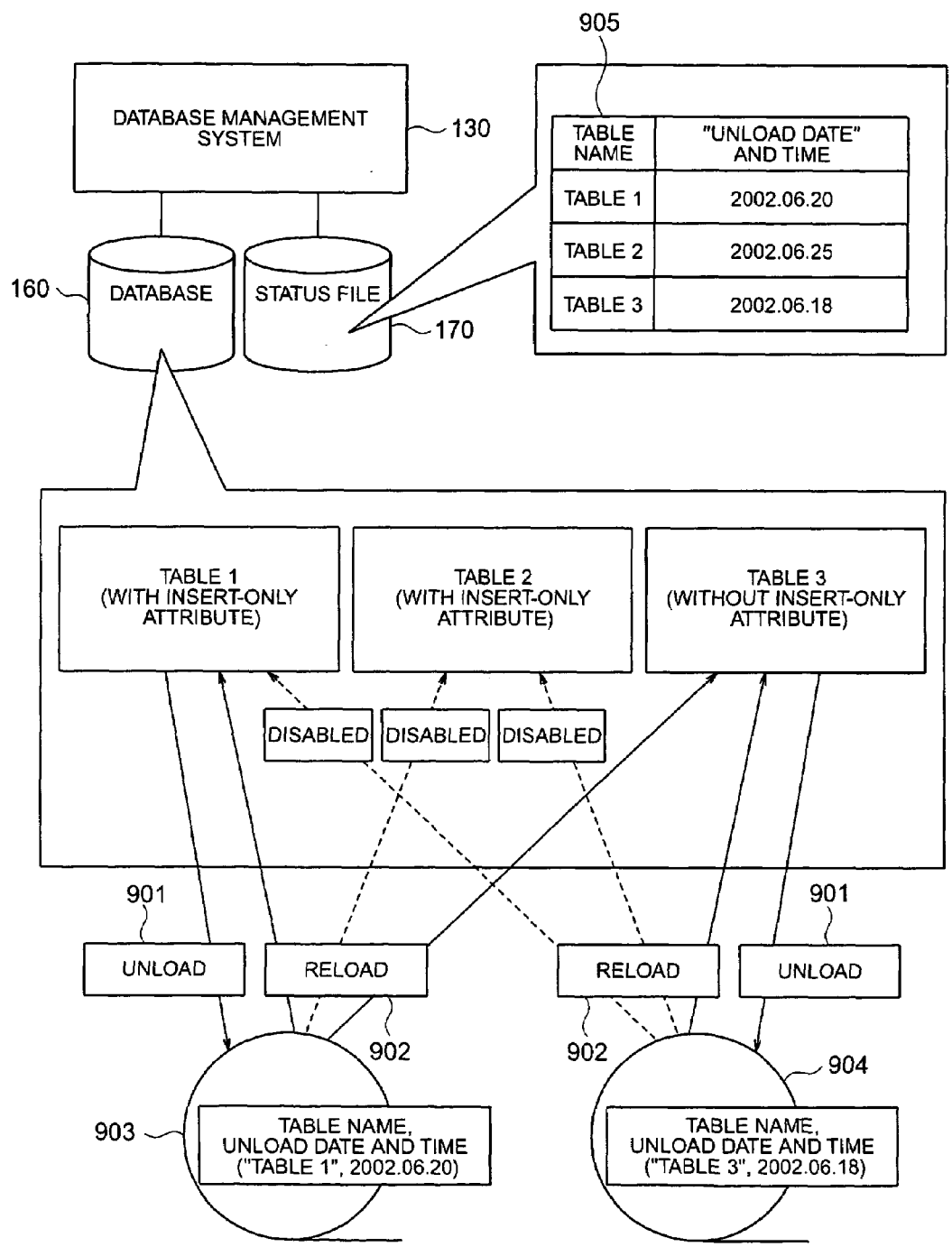
FIG. 9 is a diagram showing the execution of an unload and reload process in the system.

FIG. 9 shows a process of unloading and reloading table data according to the present invention. Herein, the term "status file" means a file in which information including a state of the database management system, the state of the database, and so forth is saved and then which is referenced when the database management system is restarted. Further, the term "unload" means a duplicate of the content of the database onto the external storage medium such as a magnetic tape, which is called a back-up. The term "reload" means a write-back of the unloaded data onto the database. With reference to FIG. 9, the description will be oriented to the ability of unloading the tables each having the insert-only attribute (tables 1 and 2) and the table having no insert-only attribute (table 3) on Jun. 20, 2002, Jun. 25, 2002, and Jun. 18, 2002, respectively and then reloading those tables onto the unload mediums of the tables 1 and 3 onto each table. At first, the description will be oriented to the unload of the data of the table (table 1) with the insert-only attribute. A numeral 901 denotes an unload utility, which operates to copy the data of the table 1 with the insert-only attribute onto an external storage medium 903. At a time, the unload utility operates to record the table name and the unload date and time onto a status file (905) and the external storage medium 903. When a reload utility 902 writes the data on the medium 903 back onto the database, the reload of the data onto the same table (table 1) may be executed only when the unload date and time in the status file is matched to the unload date and time and the table name in the unload utility 903. The reload of the data onto the other table (table 2) with the insert-only attribute is disabled. The reload of the data onto the other table (table 3) with no insert-only attribute is enabled. Then, the description will be oriented to the unload of the data of the table (table 3) with no insert-only attribute. The unload utility operates to copy the data of the table 3 on a medium 904. The medium 904 may reload the data onto the table with no insert-only attribute but may not reload the data onto the table (table 1 or 2) with the insert-only attribute.

Figure 10:
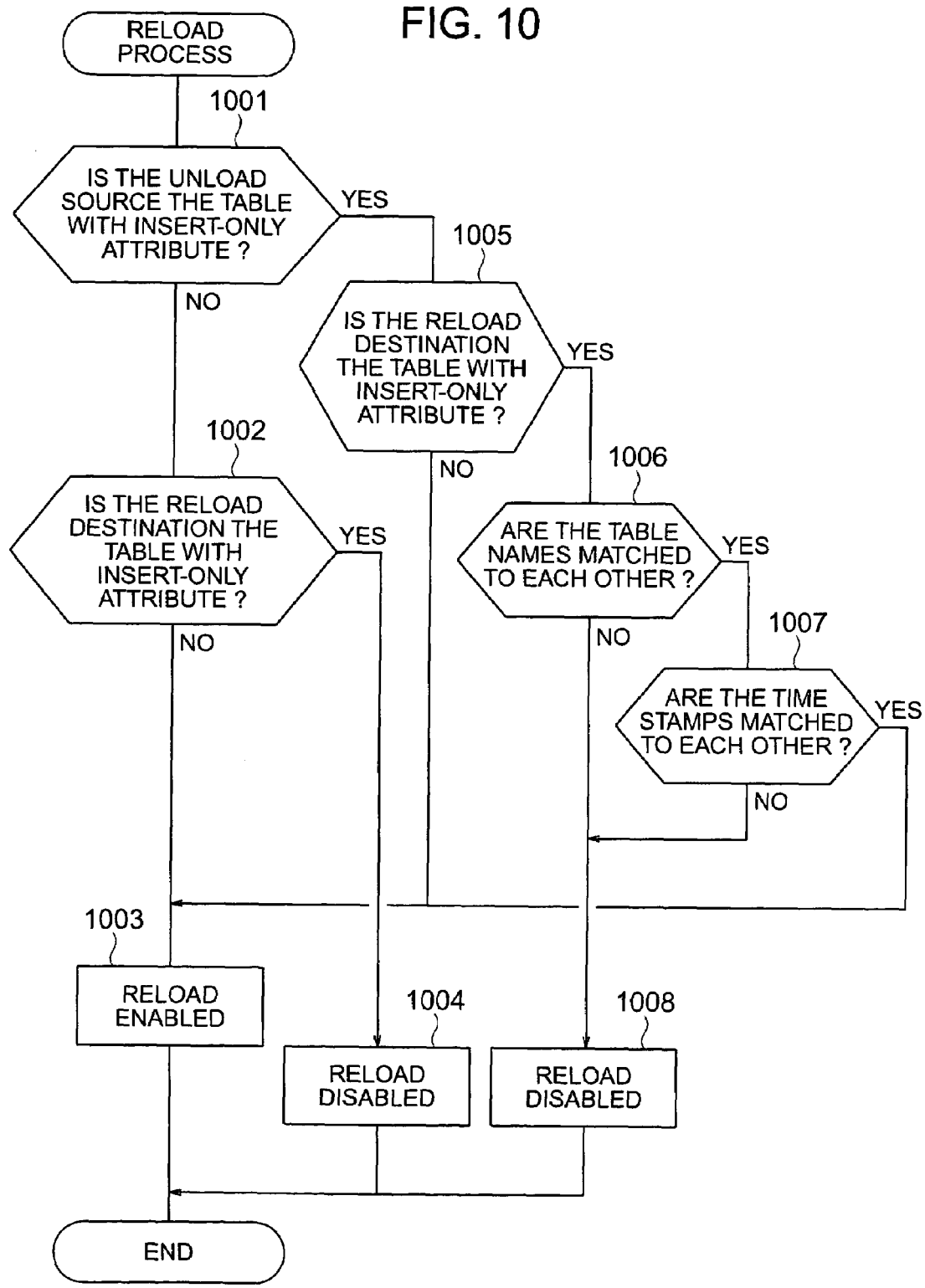
FIG. 10 is a flowchart showing a flow of a reload process.

FIG. 10 shows a flow of a reload process. In the reload process, at first, it is checked if the unload source is the table with the insert-only attribute (1001). If no, that is, the unload source is the table with no insert-only attribute, then, it is checked if the reload destination is the table with the insert-only attribute (1002). If no, the reload process is executed (1003). If yes in the step 1002, the reload is disabled (1004). If yes in the step 1001, then, it is checked if the reload destination is the table with the insert-only attribute (1005). If no, that is, the reload destination is the table with no insert-only attribute, the reload process is executed (1003). If yes in the step 1005, then, it is checked if the table name of the unload source is matched to that of the reload destination (1006). If not matched, the reload is disabled (1008). If matched in the step 1006, then, the unload date and time of the concerned file in the status file is compared with that stored in the external storage medium (1007). If matched, the reload process is executed. If not matched, the reload is disabled (1008). Concretely, consider the case that the unloaded data 903 of the table 1 shown in FIG. 9 is reloaded onto the table 2. Since the table 1 of the unload source includes the insert-only attribute, "Yes" is given in the step 1001. Since the table 2 of the reload destination includes the insert-only attribute, "Yes" is given in the step 1005. Since the name of the table 1 is different from that of the table 2, "No" is given in the step 1006. Hence, the reload is disabled. Further, concretely, consider the case that the unloaded data 903 of the table 1 shown in FIG. 9 is reloaded onto the table 1 itself. In this case, "Yes" is given in the step 1001, "Yes" is also given in the step 1005, and "Yes" is also given in the step 1006. Since the date and time of the unloaded data 903 is matched to the unload date and time of the table 1 in the status file, "Yes" is given in the step 1007, and thus the unload is enabled. In the case of using the unload medium of the previous generation for the table 1, the unload data and time is not matched with that stored in the medium in the step 1007. Hence, the unload is disabled. Concretely, consider the case that the unloaded data 904 of the table 3 shown in FIG. 9 is reloaded onto the table 1. Since the table 3, that is, the unload source includes the insert-only attribute, "No" is given in the step 1001, while since the table 1, that is, the reload destination includes the insert-only attribute, "Yes" is given in the step 1002. Hence, the reload is disabled.

According to the aforementioned process, the database management system is arranged to have in the dictionary the insert-only attribute, the row deletion prohibition period, and the row insertion date and time holding column name as the table attributes. The system operates to check the table attribute and the row insertion date and time when the table data is updated or the row deletion is requested. By this check, the system disallows the table data that is not to be updated to be updated even by the table owner or the person to which the update right is transferred, for the purpose of preventing the table data from being falsely or erroneously updated. Further, after the row is inserted, the system operates to disallow the row deletion of the table data whose row data is not to be deleted during a certain period even by the table owner or the person to whom the row deletion right is transferred, for the purpose of preventing the row of the table data from being falsely or erroneously deleted.

The embodiments shown in FIGS. 11 to 14 are arranged to disable the data update of the table with the insert-only attribute and thus basically same as those shown in FIGS. 2 to 8 except the following different respects. That is, FIGS. 11 to 14 show the embodiment in which the parameter P3 is implicitly specified based on whether or not the parameter P1 is specified without the user's specification of the parameter P3 shown in FIG. 2, the embodiment in which the data update is enabled on the data insertion date, and the embodiment in which the definition of the insert-only attribute is enabled at a column unit.

Figure 11:
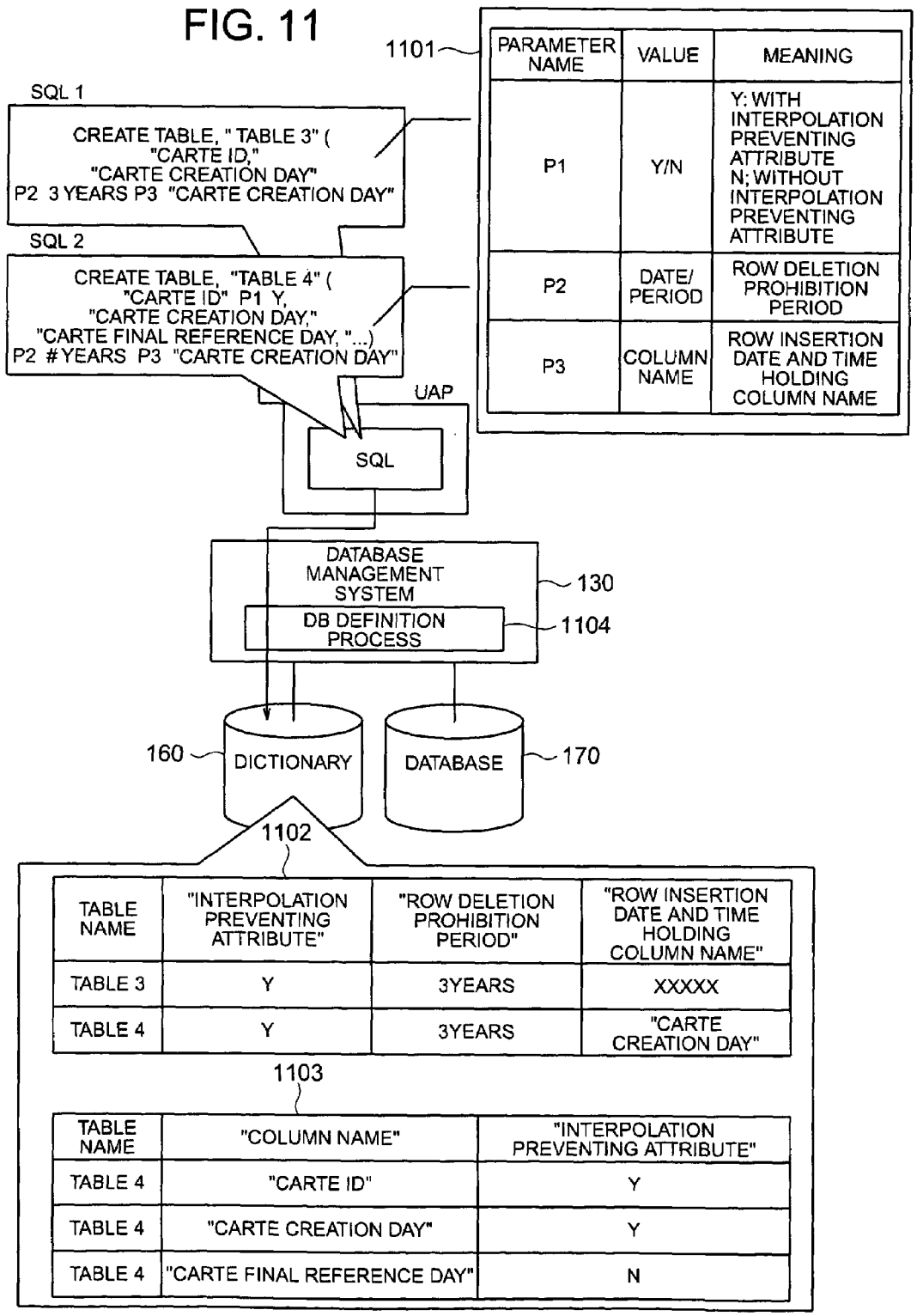
FIG. 11 is a diagram showing an exemplary content of a dictionary table in which a define statement for defining interpolation prevention and tamperproof information are stored.

Like the embodiment of FIG. 2, FIG. 11 shows an example of the table define statement that is the feature of the present invention and the saving state of the interpolation prevention define information in the dictionary. The embodiment shown in FIG. 11 is characterized to implicitly specify the parameter 3 based on whether or not the parameter P1 is specified without the user's specification of the parameter P3 and to make the definition of the insert-only attribute on a column unit possible. SQL1 is an example of SQL that has the same attribute as the table 2 as shown in FIG. 2 and defines the parameter P3 without the user's specification. In this SQL example, after the row insertion, the row may be deleted only when three years have passed since the row is inserted. In the SQL1, "Three years" are specified to the row deletion prohibition period but no row insertion history holding column name is specified. A DB define process 1104 is executed to specify the parameter P2 in the SQL, if no parameter P3 is specified, determine that the row insertion date and time holding column is required to be implicitly specified, and thereby implicitly define the column "XXXXX" as the row insertion holding column. This allows the column "XXXXX" to be saved in the column of the row insertion date and time holding column names, which corresponds with the table 3 of the dictionary 1102. In this embodiment, the DB define process 1104 is exemplarily executed to define "XXXXX" as the row insertion date and time holding column name. In general, the database management system allows the user to optionally change and add the column name. Hence, as to the column name provided when the DB define process 1104 is executed to implicitly specify the row insertion date and time holding column name, it is necessary to use as its name the name that cannot be used by the user. In the table 4 indicated in the SQL2, the insert-only attribute may be specified by specifying the parameter name P1 indicated in 1101 on the column unit. In the table 4, by specifying "Y" to the "carte ID", the table is specified to have the insert-only attribute and the column "carte ID" is specified to have the insert-only attribute as well. Further, the "Y" that indicates the interpolation prevention is saved in the column with the insert-only attribute in the dictionary 1102, and the "Y" that indicates the interpolation prevention is saved in the insert-only attribute column of the dictionary table 1103 for managing the define information of the column. Further, in the table 4, in addition to the insert-only attribute, the row deletion prohibition period is specified to the parameter name P2 indicated in 1101. However, the flow of defining the row deletion prohibition period is the same as that shown in the table 3, and thus is not described herein.

Figure 12:
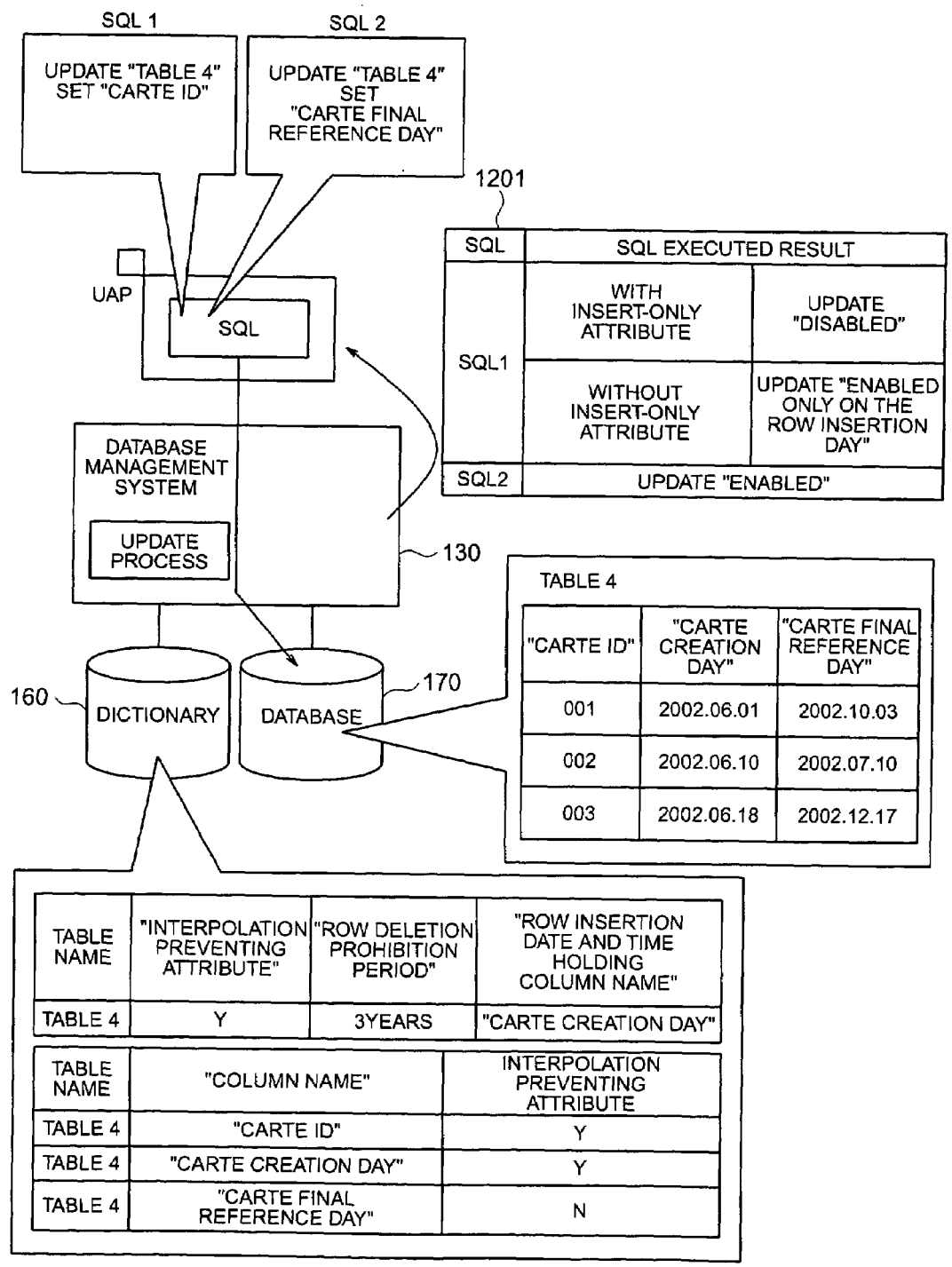
FIG. 12 is a diagram showing the execution of table data update SQL in the system.

The embodiment shown in FIG. 12 concerns the execution of the update SQL of the table data after inserting the data to the table 4 in which the insert-only attribute is defined on the column unit defined in FIG. 11 and further concerns the arrangement wherein the table data update of the table or the column with the insert-only attribute is enabled on the row insertion day. In FIG. 2, the overall table has been exemplarily specified to have the insert-only attribute. For example, in a case that a personnel management database includes a surname column and a given name column separated from each other, if the surname is changed by a marriage, it is assumed that the surname is required to be changed, that is, the data update is required. Further, the embodiment in FIG. 4 concerns with the arrangement wherein the update is completely disabled within the deletion prohibition period after the row insertion. In actual, however, it is assumed that from a practical viewpoint, the request frequently takes place for modifying or updating the erroneous data resulting from an erroneous keying in the inserted data. Herein, the SQL1 is an SQL that indicates the update of the column with the insert-only attribute of table 4. The SQL2 is an SQL that indicates the update of the column with no insert-only attribute of the table 4. The flow of executing the row deletion SQL is the same as that shown in FIG. 4, and thus is not described herein. In the case of executing the SQL (SQL1) that indicates the table data update of the column with the insert-only attribute with respect to the table 4 with the insert-only attribute, the database management system operates to give back to the UAP the information indicating the target row may be updated on the insertion day but may not be updated on the other day (1201). In the case of executing the SQL (SQL2) that indicates the table data update of the column with the insert-only attribute with respect to the table 4 with the insert-only attribute, the database management system gives back to the UPA the information indicating the UPDATE enabled (1201).

Figure 13:
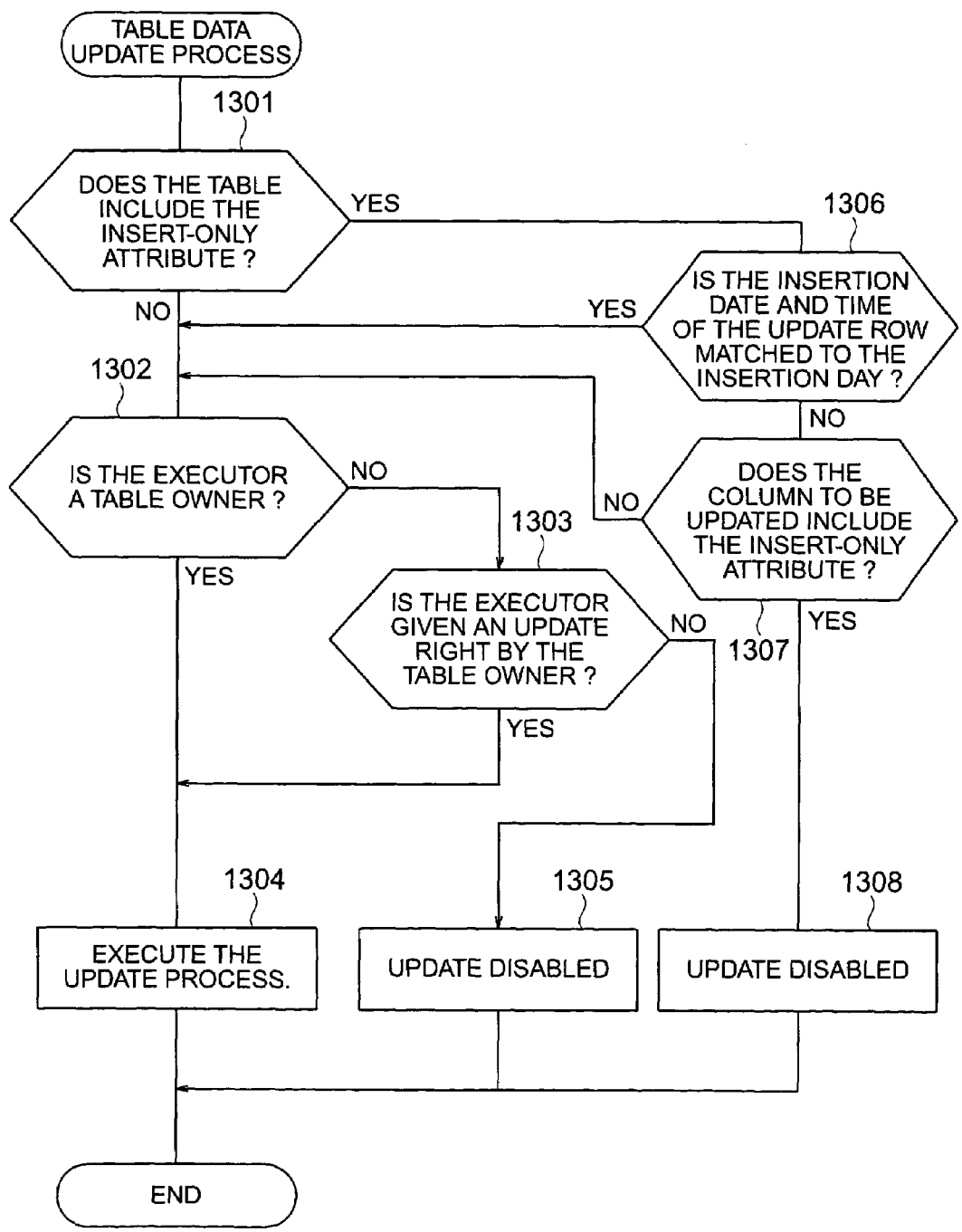
FIG. 13 is a flowchart showing a flow of data update.

Like the embodiment shown in FIG. 5, FIG. 13 shows the flow of a process of updating table data. The embodiment shown in FIG. 13 is arranged to control the update "enabled" or "disabled" based on whether or not the insert-only attribute is specified on the column unit and make the update of the table data on the very row insertion day possible. In FIG. 5, in the case of requesting the update of the table data, it is checked if the table includes the insert-only attribute (501), and the update is disabled (506). In a case that the update of the table data is enabled on the row insertion day, it is possible to realize this update by adding the process of checking if the table includes the insert-only attribute and then the process of checking if the insertion day of the row to be updated is the day when the row was inserted (1306). In the case of requesting the update of the table data, at first, it is checked if the table includes the insert-only attribute (1301). If no, it is also checked if the executor of the table data update is a table owner (1302). If yes, the update process is executed (1304). If no in the step 1302, it is checked if the executor of the table data update is given the update right to the concerned table by the table owner (1303). If yes, the update process is executed (1304). If no, the update is disabled (1305). If in the step 1301 yes, that is, the table includes the insert-only attribute, it is checked if the insertion day of the row to be updated is the row insertion day (1306). If yes, the process after the step 1302 is executed. If no, it is checked if the column to be updated includes the insert-only attribute (1307). If yes, the update is disabled even for the table owner (1308), while if no, the process after the step 1302 is executed. In this embodiment, though in the table with the insert-only attribute a row update postponement period is the row insertion day, if the table includes the row insertion date and time holding column, it is possible to provide a more particular update postponement period such as within 24 hours from the row insertion date and time or within 12 hours therefrom. In this case, this may be realized by changing the checked content (1306) as to if the insertion day of the row to be updated is the row insertion day into "within 24 hours from the row insertion date and time holding column". As described above, FIGS. 12 and 13 show the embodiments in which the update postponement period is provided in the case of specifying the insert-only attribute on the column unit. In the case of providing no insert-only attribute on the column unit as shown in FIG. 2, the embodiment may be realized by regarding no insert-only attribute on the column unit as the presence of the insert-only attribute and adding the condition of "or the column where no insert-only attribute is specified" to the process (1307) of checking if the column to be updated in FIG. 13 includes the insert-only attribute specified thereto.

Figure 14:
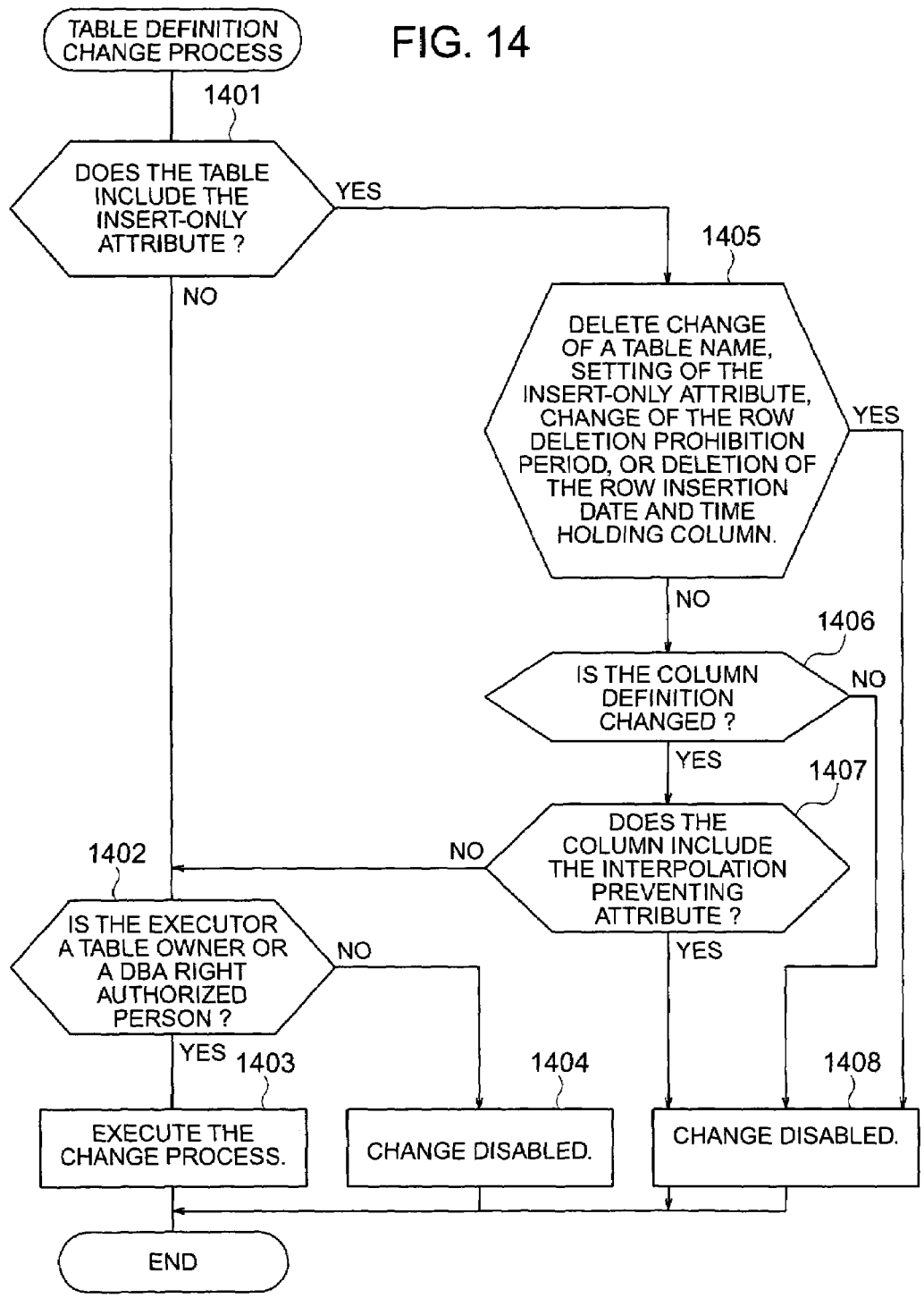
FIG. 14 is a flowchart showing a flow of table definition change.

FIG. 14 shows a flow of a process of changing a table definition to the table where the insert-only attribute is defined on a column unit. In response to a request for changing the table definition, at first, it is checked if the table includes the insert-only attribute (1401). If no, it is checked if the executor of changing the table definition is a table owner or a DBM authorized person (1402). If yes, the process of changing the table definition is executed (1403). The term "DBA authorized person" is a user having a manager right of the database management system. In the database management system, normally, the users are roughly separated into the "DBA authorized person" and the "ordinary user". The DBA authorized person enables to use the dedicated database management function the ordinary user disables to use. If the executor is not the table owner or the DBA authorized person in the step 1402, the table definition change is disabled (1404). If the table includes the insert-only attribute in the step 1401, it is checked if the attribute indicates to any one of the change of the table name, the release of the insert-only attribute, the change of the row deletion prohibition period, or the deletion of the row insertion date and time holding column (1405). If it matches to any one of them, the table definition change is disabled even for the table owner or the DBA authorized person (1408). If it matches to none of them in the step 1405, it is checked if the attribute indicates the definition change of the column (1406). If yes, it is also checked if the column includes the insert-only attribute (1407). If yes, the table definition change is disabled (1408). If no in the step 1407, the process of the steps 1402 or later is executed. If no in the step 1406, the table definition change is disabled even for the table owner or the DBA authorized person (1408).

As set forth above, the present invention is capable of protecting the data not to be updated in the database from being falsely or erroneously updated by the table owner, the person to whom the update right is transferred, or the person who passes himself or herself off as those persons.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A database management method for managing a database including a table, said method comprising the steps of:

entering a database definition request including identification information for specifying a database and access attribute information of said database;

wherein said access attribute information includes tamper proof information regarding the table included in the database for protecting the database including the table from being falsely or erroneously updated, wherein the set of tamper proof information associated with the table applies to all users of the database;

wherein said tamper proof information defines whether the table is associated with an insert-only attribute which indicates that the table can not be updated, row deletion prohibiting period information which indicates a time period during which a row of the table can not be deleted, beginning at the time the row was inserted into the database, and row insertion date and time holding information which indicates the date and time a row is inserted into the table;

if the table is associated with said insert-only attribute, authorizing data insertion and access to data in the table of said database and not authorizing update of the table;

if the table is associated with said insert-only attribute and said row deletion prohibiting period information, authorizing deletion of a row of the table of said database provided the time period during which the row of the table can not be deleted has expired;

if the table is associated with said insert-only attribute and said row insertion date and time holding information, storing date and time information indicating the date and time a row is inserted into the table of said database; and disabling change of said insert-only attribute after said insert-only attribute is specified, wherein said attribute cannot be changed other than by a manager of an upper database level.

2. A database management method as claimed in claim 1, further comprising the steps of:

executing data insertion processing after date and time information to be stored has been created;

if said time period during which a row of the table can not be deleted has passed since the time when said row to be deleted was registered, authorizing deletion of said row to be deleted; and if said time period during which a row of the table can not be deleted has not passed since the time when said row to be deleted was registered, prohibiting the deletion of said row to be deleted.

3. A database management method as claimed in claim 1, wherein the table of said database associated with said insert-only attribute holds an unload date and time in said database, in the case of reloading said database, it is determined if said unload date and time is matched to that stored in an external storage medium, and if matched, the process of reloading said database is executed.

4. A database management method as claimed in claim 1, wherein if no insert-only attribute is associated with the table of said database to be unloaded, the reload of said database to be unloaded, and wherein the reload of said database with said insert-only attribute specified thereto is prohibited.

5. A database management method as claimed in claim 1, wherein said insert-only attribute is specified to a column of the table of said database.

6. A database management apparatus for managing a database including a table, comprising:

means for entering a database definition request identification information for specifying a database and access attribute information of said database, wherein said access attribute information includes tamper proof information regarding the table included in the database for protecting the database including the table from being falsely or erroneously updated wherein the set of tamper proof information associated with the table applies to all users of the database, wherein said tamper proof information defines whether the table is associated with an insert-only attribute which indicates that the table can not be updated, row deletion prohibiting period information which indicates a time period during which a row of the table can not be deleted, beginning at the time the row was inserted into the database, and row insertion date and time holding information which indicates the date and time a row is inserted into the table; and means for, if the table is associated with said insert-only attribute, authorizing data insertion and access to data in the table of said database and not authorizing update of the table, if the table is associated with said insert-only attribute and said row deletion prohibiting period information, authorizing deletion of a row of the table of said database provided the time period during which the row of the table can not be deleted has expired, if the table is associated with said insert-only attribute and said row insertion date and time holding information, storing date and time information indicating the date and time a row is inserted into the table of said database, and disabling change of said insert-only attribute after said insert-only attribute is specified, wherein said attribute cannot be changed other than by a manager on an upper database level.

7. A database management program, stored on a storage medium, for managing a database including a table, said database management program when executed cause a computer to perform the steps of:

entering a database definition request including identification information for specifying a database and access attribute information of said database;

wherein said access attribute information includes tamper proof information regarding the table included in the database for protecting the database including the table from being falsely or erroneously updated, wherein the set of tamper proof information associated with the table applies to all users of the database wherein said tamper proof information defines whether the table is associated with an insert-only attribute which indicates that the table can not be updated, row deletion prohibiting period information which indicates a time period during which a row of the table can not be deleted, beginning at the time the row was inserted into the database, and row insertion date and time holding information which indicates the date and time a row is inserted into the table;

if the table is associated with said insert-only attribute, authorizing data insertion and access to data in the table of said database and not authorizing update of the table;

if the table is associated with said insert-only attribute and said row deletion prohibiting period information, authorizing deletion of a row of the table of said database provided the time period during which the row of the table can not be deleted has expired;

if the table is associated with said insert-only attribute and said row insertion date and time holding information, storing date and time information indicating the date and time a row is inserted into the table of said database; and disabling change of said attribute after said attribute is specified, wherein said attribute cannot be changed other than by a manager of an upper database level.

* * * * *

UNITED STATES PATENT AND TRADEMARK OFFICE
CERTIFICATE OF CORRECTION

| | |
|---|---|
| PATENT NO. | : 7,127,462 B2 |
| APPLICATION NO. | : 10/602621 |
| DATED | : October 24, 2006 |
| INVENTOR(S) | : Shigeto Hiraga et al. |

It is certified that error appears in the above-identified patent and that said Letters Patent is hereby corrected as shown below:

On the title page insert the following:
-- (73) Assignees: HITACHI, LTD., Tokyo (JP);
HITACHI CHUGOKU SOFTWARE, LTD., Hiroshima (JP) --.

Signed and Sealed this

Fourteenth Day of August, 2007

JON W. DUDAS
*Director of the United States Patent and Trademark Office*